Nov. 21, 1967  E. K. HANSEN  3,353,952
METHOD AND APPARATUS FOR PRODUCING PELLETS
OF FINELY DIVIDED MATERIALS
Filed June 11, 1965
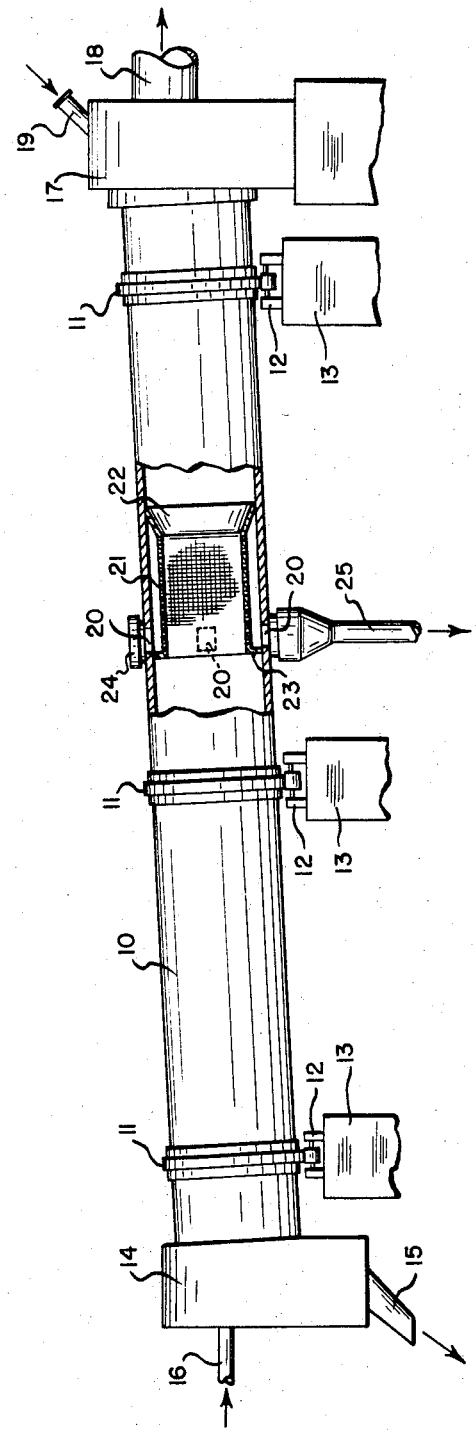
INVENTOR
Eyvind Kjellerup Hansen
BY
ATTORNEYS United States Patent Office 3,353,952
Patented Nov. 21, 1967

3,353,952
METHOD AND APPARATUS FOR PRODUCING
PELLETS OF FINELY DIVIDED MATERIALS
Eyvind Kjellerup Hansen, Copenhagen-Valby, Denmark,
assignor to F. L. Smidth & Co., New York, N.Y., a
corporation of Delaware
Filed June 11, 1965, Ser. No. 463,229
4 Claims. (Cl. 75—3)

This invention relates to the production of pellets of finely divided material suitable for charging into smelting furnaces, of which blast furnaces are an example. More particularly, the invention is concerned with a novel method by which raw pellets of a finely divided material may be hardened by heating in a rotary kiln without substantial loss, and with a kiln, by which the method may be advantageously practiced. The method of the invention is not restricted in utility to specific materials but is especially useful in the preparation of iron-bearing pellets for charging into a blast furnace and formed of such materials as iron ore fines, red or brown hematite, spathic iron, blast furnace dust, or pyrite-ashes. As all the advantages of the invention are realized in its use in the production of pellets of iron ore fines, a form of the method and apparatus suitable for the production of pellets of that material will be described and illustrated for purposes of explanation.

Finely divided iron ores of a particles size up to about 10 mm. are unsuitable for charging into blast and other furnaces and it is common practice to convert such ores into agglomerates or pellets in order that they may be so charged. Raw pellets may be produced in a nodulizing drum or other pelletizing machine with the addition of water or other binding agent and such pellets must be hardened before use. For this purpose, they may be burnt on moving gas-permeable grates, in rotary kilns, or in shaft furnaces.

When raw pellets are hardened in a rotary kiln, the tumbling action, to which they are subjected, causes considerable breakage. As a result, dust and fines are produced which must be separated from the pellets, and such separated material is normally returned to the pelletizing machine to be formed into fresh pellets. The loss of the pellets by breakage in a rotary kiln is a disadvantageous feature of the use of a kiln in the heat-hardening operation, which it has not been possible to avoid heretofore.

The present invention is directed to a method by which raw pellets of finely divided material may be heat-hardened in a rotary kiln without substantial loss. In the practice of the method, a mixture of the finely divided material and raw pellets is introduced into the upper end of the kiln and advances through the kiln with a tumbling movement as the kiln rotates. In such tumbling movement, the finely divided material cushions the pellets and protects them against injury. Fuel is burned within the kiln adjacent to its lower end and the hot gases travel through the kiln countercurrent to the advancing material. In the first part of the movement of the mixture through the kiln, the mixture is preheated and, as a result, moisture is driven from the pellets and they are hardened to an extent such that they can travel through the kiln alone without substantial breakage resulting from tumbling. Accordingly, at the end of the preheating treatment, the mixture is subjected to a separating operation within the kiln and the fines are removed through openings in the kiln shell. The pellets then continue through the kiln to be discharged at this lower end and, in such movement, the heat-hardening of the pellets is completed. The hot finely divided material issuing from the kiln may then be mixed with raw material and converted into nodules or agglomerates, which are supplied with additional finely divided material to the kiln.

For a better understanding of the invention, reference may be made to the accompanying drawing, in which the single figure is a view in side elevation with parts broken away of a rotary kiln suitable for the practice of the new method.

The kiln illustrated includes a cylindrical shell 10 provided with circumferential tires 11 resting on roller supports 12 on foundations 13. The kiln is mounted in slightly inclined position and its lower end extends into a casing 14 from which leads a discharge chute 15. A burner pipe 16 for supplying a combustible mixture to be burned within the kiln extends through the casing 14 and into the lower end of the kiln. The upper end of the kiln lies within a smoke chamber 17 and the hot gases issuing from the kiln pass through the smoke chamber and are conducted through a flue 18 to a stack.

A mixture of finely divided material and raw pellets is introduced into the kiln through a pipe 19 which extends through the chamber 17 and into the upper end of the kiln. As the kiln rotates, the mixture travels downwardly through the kiln and is heated by heat transfer from the hot gases flowing through the kiln countercurrent to the mixture. Part way down the kiln from its upper end and at a point where the preheating of the mixture is completed, the kiln is provided with openings 20 disposed in the circumferential series. A screen 21, shown as cylindrical in form, is mounted within the kiln coaxially with the latter and in such position as to lie between the openings and the kiln axis. At its upper end, the screen is connected to the kiln by an imperforate frusto-conical member 22 and its lower end is connected to the kiln by a solid radial member 23. A casing 24 encircles the kiln to overlie the openings and prevent the escape of gas therethrough and the casing is provided at its bottom with a discharge chute 25.

In the practice of the method by means of the kiln illustrated, a mixture of finely divided material and raw pellets is introduced into the kiln through the pipe 19 and travels downwardly through the kiln with a tumbling movement as the kiln rotates. During the movement of the mixture from the upper end of the kiln to the screen, the mixture is preheated and moisture driven from the raw pellets to harden them partially. The mesh of the screen is such that the screen passes the finely divided material but retains the pellets and, as the mixture enters the screen, the finely divided material passes through the screen and ultimately enters the casing 24 through the openings 20 to be discharged through the chute 25. The pellets continue through the screen and are advanced through the remainder of the kiln to be discharged at the lower end thereof. In the movement of the pellets through the kiln beyond the screen, the heat-hardening of the pellets is completed and, since they have been partially hardened in the preheating operation, the pellets suffer little additional breakage during their travel while the heat-hardening is completed.

During the travel of the pellets through the preheating zone, they are protected against damage resulting from impact against one another and against the kiln lining by the cushioning action of the finely divided material in the mixture fed to the kiln. In addition, the presence of the fines in the mixtures protects the pellets against rapid preheating which might otherwise cause breakage of pellets as a result of the sudden expulsion of moisture therefrom.

In the kiln illustrated, the screen is cylindrical but a conical screen may also be used. Also, the discharge openings through the kiln shell may be controlled by flaps or similar devices and, if desired, the kiln may be provided with the usual expedients in the preheating zone for facilitating or increasing heat transfer.

I claim:

1. A method of producing hard pellets of a finely divided material suitable for charging into a smelting furnace which comprises tumbling raw pellets in a mixture with a sufficient quantity of finely divided material that the finely divided material cushions the raw pellets, and protects them against damage resulting from impact against one another, advancing the tumbling mixture along a path, flowing gases of combustion of burning fuel countercurrent to the advancing mixture to preheat and partially harden the raw pellets without rapid preheating to the extent that they can be advanced and tumbled alone without breaking from tumbling, separating the finely divided material from the preheated pellets, continuing the tumbling and advance of the preheated pellets in a direction countercurrent to the gases of combustion for a sufficient time to heat harden the advancing pellets.

2. In a rotary kiln which comprises a generally cylindrical shell mounted for rotation on its longitudinal axis, means for introducing into the shell at one end a mixture of finely divided material and pellets of the material, the mixture advancing through the shell as the shell rotates, and means for burning fuel within the shell adjacent to its other end, the gases of combustion traveling through the shell countercurrent to the advancing mixture, the combination of a screen of less diameter than the shell mounted inside of and coaxially with the shell a substantial distance from both ends of the shell and circumferentially spaced openings extending through the shell wall, the circumferentially spaced openings through the shell wall being covered by the screen and the screen passing the finely divided material and retaining the pellets, and means for receiving the material issuing through the circumferentially spaced openings.

3. The combination of claim 2, in which space is provided between the shell and the screen at the end of the screen toward the advancing mixture and the space is closed by an imperforate frusto-conical member.

4. The combination of claim 2, in which the openings are disposed in a circumferential row, a casing encircles the zone of the shell containing the openings, and a chute leads from the bottom of the casing.

References Cited
UNITED STATES PATENTS

| | | | |
|---|---|---|---|
| 794,673 | 7/1905 | King | 75—3 |
| 822,929 | 6/1906 | Dellwik | 75—5 |
| 987,554 | 3/1911 | Coggeshall | 75—3 |
| 2,807,534 | 9/1957 | Haley et al. | 75—3 |
| 2,855,290 | 10/1958 | Freeman | 75—3 |

BENJAMIN HENKIN, *Primary Examiner.*